US008719073B1

(12) United States Patent
Kirshenbaum et al.

(10) Patent No.: US 8,719,073 B1
(45) Date of Patent: May 6, 2014

(54) PRODUCING A MEASURE REGARDING CASES ASSOCIATED WITH AN ISSUE AFTER ONE OR MORE EVENTS HAVE OCCURRED

(75) Inventors: Evan R. Kirshenbaum, Mountain View, CA (US); Henri J. Suermondt, Sunnyvale, CA (US); George H. Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3111 days.

(21) Appl. No.: 11/211,979

(22) Filed: Aug. 25, 2005

(51) Int. Cl.
*G06Q 10/00* (2012.01)
*G06Q 30/02* (2012.01)
*G06Q 30/00* (2012.01)
G06N 5/04 (2006.01)
G06F 17/30 (2006.01)

(52) U.S. Cl.
CPC .......... *G06Q 30/0201* (2013.01); *G06Q 30/016* (2013.01); *G06N 5/048* (2013.01); *G06F 17/30463* (2013.01); *Y10S 707/99948* (2013.01)
USPC ............. 705/7.32; 705/7.14; 706/52; 706/46; 707/718; 707/727; 707/999.107

(58) Field of Classification Search
CPC ........................... G06Q 30/0201; G06Q 30/00
See application file for complete search history.

(56) References Cited

U.S. PATENT DOCUMENTS

| | | | |
|---|---|---|---|
| 5,819,258 A | 10/1998 | Vaithyanathan et al. | |
| 5,872,865 A * | 2/1999 | Normile et al. | 382/224 |
| 5,903,884 A | 5/1999 | Lyon et al. | |
| 5,943,670 A | 8/1999 | Prager | |
| 6,003,027 A | 12/1999 | Prager | |
| 6,038,560 A | 3/2000 | Wical | |
| 6,418,434 B1 | 7/2002 | Johnson et al. | |
| 6,446,061 B1 | 9/2002 | Doerre | |
| 6,535,865 B1 * | 3/2003 | Skaaning et al. | 706/52 |
| 6,621,930 B1 | 9/2003 | Smadja | |
| 6,675,161 B1 | 1/2004 | Suchter | |
| 6,701,333 B2 * | 3/2004 | Suermondt et al. | 1/1 |
| 6,704,905 B2 | 3/2004 | Fukushige et al. | |
| 6,728,690 B1 | 4/2004 | Meek et al. | |
| 6,823,323 B2 | 11/2004 | Forman et al. | |
| 6,842,751 B1 | 1/2005 | Vilalta et al. | |
| 6,879,973 B2 * | 4/2005 | Skaanning et al. | 706/52 |
| 6,912,502 B1 * | 6/2005 | Buddle et al. | 705/7.41 |
| 6,925,454 B2 | 8/2005 | Lam et al. | |
| 6,944,616 B2 | 9/2005 | Ferguson et al. | |
| 6,947,936 B1 | 9/2005 | Suermondt | |
| 6,973,452 B2 | 12/2005 | Metzger et al. | |
| 6,990,485 B2 | 1/2006 | Forman | |

(Continued)

FOREIGN PATENT DOCUMENTS

EP 0747848 A2 12/1996

OTHER PUBLICATIONS

U.S. Appl. No. 11/118,178, filed Nov. 2006, Kirshenbaum et al.*

(Continued)

*Primary Examiner* — Gurkanwaljit Singh

(57) ABSTRACT

A categorizer produces a first measure regarding cases associated with an issue. Information regarding additional cases associated with the issue is received after one or more events have occurred with respect to the issue. Based on further output from the categorizer, a second measure is produced regarding the additional cases associated with the issue.

36 Claims, 8 Drawing Sheets

(56) References Cited

U.S. PATENT DOCUMENTS

| | | | |
|---|---|---|---|
| 7,043,492 B1 | 5/2006 | Neal et al. | |
| 7,051,009 B2 | 5/2006 | Suermondt et al. | |
| 7,113,957 B1 | 9/2006 | Cohen et al. | |
| 7,177,855 B2 | 2/2007 | Witkowski et al. | |
| 7,184,602 B2 | 2/2007 | Cohen et al. | |
| 7,191,435 B2* | 3/2007 | Lau et al. | 717/168 |
| 7,209,860 B2* | 4/2007 | Trsar et al. | 702/183 |
| 7,302,426 B2 | 11/2007 | Bier | |
| 7,325,005 B2 | 1/2008 | Forman et al. | |
| 7,349,917 B2 | 3/2008 | Forman et al. | |
| 7,409,404 B2 | 8/2008 | Gates | |
| 7,437,338 B1 | 10/2008 | Forman | |
| 7,464,004 B2* | 12/2008 | Das et al. | 702/188 |
| 7,499,870 B1* | 3/2009 | Petrossi | 705/7.32 |
| 7,593,904 B1 | 9/2009 | Kirshenbaum | |
| 8,144,587 B2* | 3/2012 | Heinz et al. | 370/235 |
| 2001/0011260 A1* | 8/2001 | Skaanning et al. | 706/46 |
| 2002/0184524 A1* | 12/2002 | Steele et al. | 713/201 |
| 2003/0229890 A1* | 12/2003 | Lau et al. | 717/168 |
| 2004/0243461 A1* | 12/2004 | Riggle | 705/10 |
| 2005/0015273 A1* | 1/2005 | Iyer | 705/1 |
| 2005/0021294 A1* | 1/2005 | Trsar et al. | 702/183 |
| 2005/0096866 A1 | 5/2005 | Shan et al. | |
| 2006/0095474 A1* | 5/2006 | Mitra et al. | 707/104.1 |
| 2006/0133699 A1* | 6/2006 | Widrow et al. | 382/305 |
| 2006/0173559 A1 | 8/2006 | Kirshenbaum et al. | |
| 2007/0185901 A1 | 8/2007 | Gates | |

OTHER PUBLICATIONS

Lim, E. T. K., Pan, S. L., & Chee, W. T. (2005). Managing user acceptance towards enterprise resource planning (ERP) systems—understanding the dissonance between user expectations and managerial policies. European Journal of Information Systems, 14(2), 135-149.*

Fearon, D. S., Jr. (2005). Social enaction: How talk-in-interaction constitutes social organization. (Order No. 3202688, University of California, Santa Barbara). ProQuest Dissertations and Theses,, 640-640 p.*

Azhar, S. (2005). Information systems to support decision-making in construction owner organizations: A data warehousing approach. (Order No. 3206015, Florida International University). ProQuest Dissertations and Theses, 235-235 p.*

Brown,Joel Philip,,Jr. (2003). Evaluating a technical support knowledge base: A case study in strategy, methods and organizational change. (Order No. 3097375, Indiana University). ProQuest Dissertations and Theses, 190-190 p.*

Philbin,John Patrick,,II. (2005). Strategic decision-making. group behavior, and public relations strategies. (Order No. 3178604, University of Maryland, College Park). ProQuest Dissertations and Theses, 256-256 p.*

Keah, C. T. (2002). Supply chain management: Practices, concerns, and performance issues. Journal of Supply Chain Management, 38(1), 42-53.*

Gordon H.G. McDougall, & Levesque, T. (2000). Customer satisfaction with services: Putting perceived value into the equation. The Journal of Services Marketing, 14(5), 392-410.*

Yang, G. Y., & Wu, R. C. (1993). Strategic costing & ABC. Management Accounting, 74(11), 33.*

U.S. Appl. No. 11/118,178, Examiner's Answer dated Feb. 22, 2010, pp. 1-51.

U.S. Appl. No. 11/118,178, Final Rejection dated Dec. 12, 2008, pp. 1-23 and attachments.

U.S. Appl. No. 11/172,187, Notice of Allowance dated Jun. 5, 2009, pp. 1-6 and attachments.

U.S. Appl. No. 11/172,187, Non-Final Rejection dated Dec. 8, 2008, pp. 1-9 and attachments.

U.S. Appl. No. 11/118,786, Examiner's Answer dated Dec. 8, 2008, pp. 1-21.

On feature selection in a class of distribution-free pattern classifiers Wee, W.; Information Theory, IEEE Transactions on vol. 16, Issue 1, Jan. 1970 pp. 47-55.

TV Commercial Classification by using Multi-Modal Textual Information Zheng, Y.; Duan, L.; Tian, Q.; Jin, J.S.; Multimedia and Expo, 2006 IEEE International Conference on Jul. 9-12, 2006 pp. 497-500 Digital Object Identifier 10.1 109/ICME.2006.262434.

An Autonomous Reading Machine Casey, R.G.; Nagy, G.; Computers, IEEE Transactions on vol. C-17, Issue 5, May 1968 pp. 492-503.

Self-corrective character recognition system Nagy, G.; Shelton, G., Jr.; Information Theory, IEEE Transactions on vol. 12, Issue 2, Apr. 1966 pp. 215-222.

Effect of Overlapping Projections on Reconstruction Image Quality in Multipinhole SPECT Vunckx, K.; Suetens, P.; Nuyts, J.; Medical Imaging, IEEE Transactions on vol. 27, Issue 7, Jul. 2008 pp. 972-983 Digital Object Identifier 10.1109/TM1.2008.922700.

Effect of Overlapping Projections on Reconstruction Image Quality in Multipinhole SPECT Vunckx, K.; Nuyts, J.; Nuclear Science Symposium Conference Record, 2006. IEEE vol. 5, Oct. 29-Nov. 1, 2006 pp. 2826-2833 Digital Object Identifier 10.1109/NSSMIC.2006. 356466.

Segmentation and Quantification of Blood Vessels in 3D Images using a Right Generalized Cylinder State Model Florez-Valencia, L.; Azencot, J.; Vincent, F.; Orkisz, M.; Magnin, I.E.; Image Processing, 2006 IEEE International Conference on Oct. 8-11, 2006 pp. 2441-2444 Digital Object Identifier 10.1109/ICIP.2006.312770.

Forman et al., U.S. Appl. No. 11/080,098, entitled "A Method of, and System for, Classification Count Adjustment," filed Mar. 14, 2005, pp. 1-31, Figs. 1A-5.

Kirshenbaum et al., U.S. Appl. No. 11/118,178, entitled "Providing Training Information for Training a Categorizer," filed Apr. 29, 2005, pp. 1-39, Figs. 1-3E.

Kirshenbaum et al., U.S. Appl. No. 11/118,786, entitled "Computing a Quantification Measure Associated with Cases in a Category," filed Apr. 29, 2005, pp. 1-35, Figs. 1-3D.

Kirshenbaum et al., U.S. Appl. No. 11/172,187, entitled "Effecting Action to Address an Issue Associated with a Category Based on Information that Enables Ranking of Categories," filed Jun. 30, 2005, pp. 1-52, Figs. 1-5H.

Forman et al., U.S. Appl. No. 11/393,487, entitled "Comparing Distributions of Cases Over Groups of Categories," filed Mar. 30, 2006, pp. 1-39, Figs. 1-7E.

Forman et al., U.S. Appl. No. 11/364,108, entitled "Identifying an Emerging or New Category," filed Feb. 28, 2006, pp. 1-34, Figs. 1-6.

Shan, U.S. Appl. No. 11/117,989, entitled "Performing Quality Determination of Data," filed Apr. 29, 2005, pp. 1-32, Figs. 1-9.

Shan, U.S. Appl. No. 11/118,832, entitled "Determining a Time Point Corresponding to a Change in Data Values Based on Fitting with Respect to Plural Aggregate Value Sets," filed Apr. 29, 2005, pp. 1-26, Figs. 1-8.

Shan, U.S. Appl. No. 11/119,037, entitled "Detecting Change in Data," filed Apr. 29, 2005, pp. 1-26, Figs. 1-6.

Office Action dated Jun. 2, 2008 in U.S. Appl. No. 11/118,178.

Office Action dated Oct. 16, 2007 in U.S. Appl. No. 11/118,178.

Office Action dated Sep. 18, 2007 in U.S. Appl. No. 11/118,786.

Office Action dated Jan. 17, 2008 in U.S. Appl. No. 11/386,005, now U.S. Patent No. 7,437,338.

Final Rejection dated Apr. 18, 2008 in U.S. Appl. No. 11/118,786.

U.S. Appl. No. 11/118,786, Decision on Appeal dated Nov. 30, 2011 (15 pages).

* cited by examiner

PRODUCING A MEASURE REGARDING CASES ASSOCIATED WITH AN ISSUE AFTER ONE OR MORE EVENTS HAVE OCCURRED

BACKGROUND

Whenever an organization (such as a business organization, educational organization, or government organization) is involved in providing services to customers or other users, various issues, such as problems, tend to arise. For example, whenever a new product is introduced into a market, some users will encounter difficulties due to actual defects of the product or due to users being unable to figure out how to properly use the product. In this example, two types of problems exist: a defect in the product; or lack of information provided to the user regarding use of the product. Typically, several problems can be associated with products or services provided by an organization.

To address problems associated with products or services, an organization may identify one or more of the problems that the organization deems to be the most important, and allocate resources to discover the underlying causes and come up with solutions for the one or more problems. As examples, the fixes that can be implemented can take the form of redesigning a product, implementing a fix of a current product, introducing new documentation or modifying documentation for customers, providing on-line support documentation, and so forth.

Conventionally, a mechanism does not exist that allows an organization to efficiently determine the effect of a fix or other event with respect to one or more problems that the organization has expended resources to fix or otherwise address. Often, determining the effect is manually performed by customer support experts within the organization based on a "gut feeling" of the expert or some other unreliable indication of the effects of a fix or other action with respect to a problem. Such determination of the effects of a fix or other action with respect to a problem is usually inaccurate, and can vary from person to person.

BRIEF DESCRIPTION OF THE DRAWINGS

Some embodiments of the invention are described with reference to the following figures.

DETAILED DESCRIPTION

Figure 1:
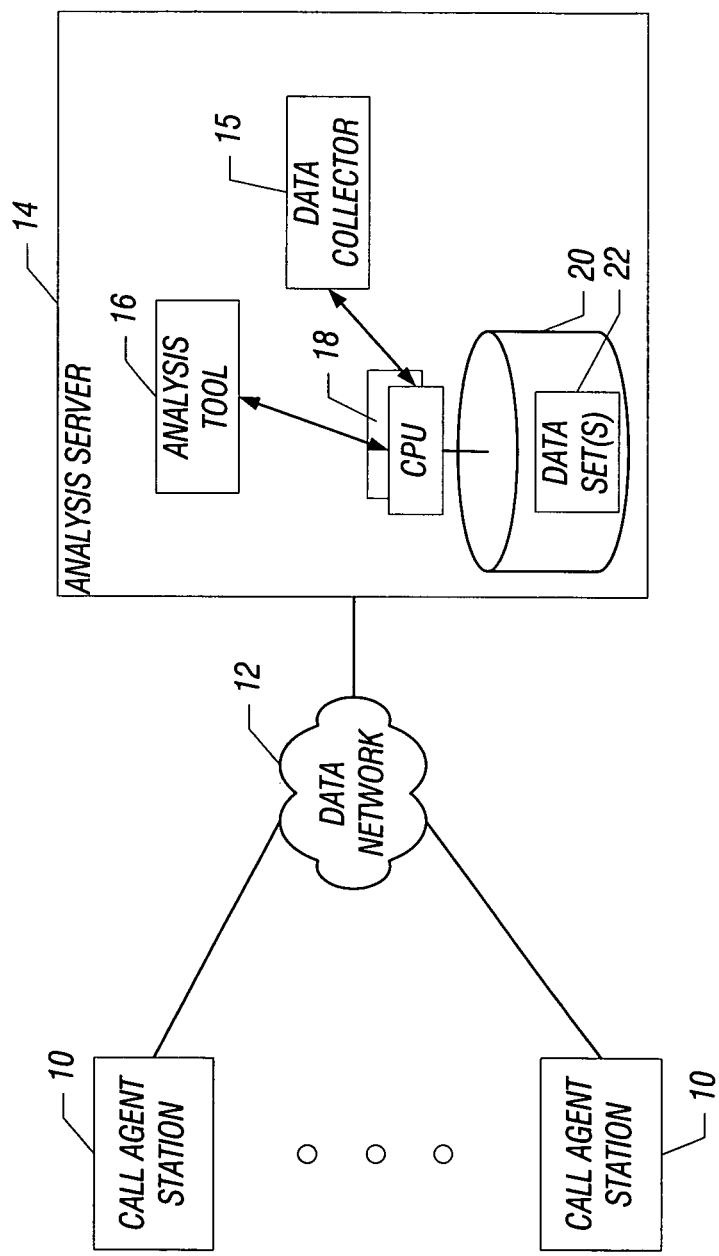
FIG. 1 is a block diagram of a network that includes call agent stations coupled to an analysis server, according to an embodiment.

FIG. 1 illustrates nodes coupled to a data network 12, where the nodes include call agent stations 10 and an analysis server 14. In the example of FIG. 1, the call agent stations 10 are associated with call agents (such as customer support personnel) in a customer support organization. The call agent stations 10 communicate over the data network 12 to the analysis server 14. As call agents receive calls from customers, information pertaining to the calls is entered by the call agents into the call agent stations 10. The entered information is communicated over the data network 12 to the analysis server 14, where a data collector 15 stores the information in one or more data sets 22. In other implementations, the analysis server 14 can be used in other contexts aside from a customer support context. Also, the call agent stations 10 can be omitted in other implementations.

The one or more data sets 22 are stored in a storage 20. The storage 20 can be persistent storage (such as magnetic or optical disk drives or non-volatile semiconductor memory devices), volatile memory (such as dynamic random access memories or static random access memories), or other types of storage devices. The storage 20 is connected to one or plural central processing units (CPUs) 18 in the analysis server 14. Alternatively, the one or more data sets 22 are stored on a database system separate from the analysis server 14.

The data collector 15 is executable on the one or plural CPU(s) 18. Also, as depicted in FIG. 1, the analysis server 14 includes an analysis tool 16 that is also executable on the CPU(s) 18. The analysis tool 16 performs analysis of the information contained in the data set(s) 22 stored in the storage 20. The information in the data set(s) 22 is collected as individual cases associated with calls received by call agents at call agent stations 10. A "case" refers to a data item that represents a thing, event, or some other item. Each case is associated with predefined information (e.g., product description, summary of problem, time of event, and so forth).

In different implementations, information associated with cases in the data set(s) 22 can be provided to the analysis server 14 by some other mechanism. For example, the information can be entered through a user interface of the analysis server 14. Alternatively, the analysis server 14 can collect the information from various data sources, such as over the network 12.

In different implementations, information associated with cases in the data set(s) 22 can be provided to the analysis server 14 by some other mechanism. For example, the information can be entered through a user interface of the analysis server 14. Alternatively, the analysis server 14 can collect the information from various data sources, such as over the network 12.

Optionally, the analysis tool 16 in the analysis server 14 is an interactive analysis tool that allows a user to interact with the analysis tool 16 for the purpose of identifying categories relevant for the cases contained in the data set(s) 22. The analysis tool 16 also optionally enables the creation of training cases, based on user input (described further below), from the cases for the purpose of training a categorizer or plural categorizers in the analysis tool 16. Note that the cases stored in the data set(s) 22 include unlabeled cases (cases that are not initially identified with any particular category or categories) as well as labeled cases (cases that have been labeled as belonging to a category or plural categories). In accordance with some embodiments of the invention, the analysis tool 16 is also able to quantify the effect of an action taken with respect to a particular category (such as release of a software patch to fix a software problem). Based on the output from the analysis tool 16, an organization or user will be able to determine whether the action taken with respect to the particular category has been effective or not.

In the customer support context, a "case" represents an instance of an interaction between a customer (e.g., a user, patron, subscriber, visitor, member, employee, participant, constituent, supplier, partner, etc.) and an organization (e.g., company, manufacturer, store, provider, employer, representative, etc.) that is indicative of satisfaction or dissatisfaction with something at least partially under control of the entity or another party the entity represents. A "category" (e.g., problem, issue, concern, etc.) represents an underlying reason for the interaction (such as satisfaction or dissatisfaction that led to the case). Such categories can reflect problems associated with a product or service (e.g., defects in product design or manufacture, hardware problems, software problems, hard disk problems, battery problems, and so forth), difficulties in understanding how to correctly use a product or service, difficulty obtaining a product or service, difficulty obtaining information about a product or service, concerns about the value of a product or service, desires for features lacking in a product or service, poor experience interacting with the entity, and so forth. Other entity/customer relationships (e.g., employer/employee, government/constituent) will have similar sets of categories reflecting the types of concerns the customers have and the types of control the entities have. In other environments, other types of categories are employed.

Although described in the context of a customer support environment that includes call agents receiving calls at call agent stations, other embodiments of the invention are applicable to other types of systems for other types of organizations (e.g., educational organizations, government organizations, business organizations, financial organizations, and so forth).

Figure 2:
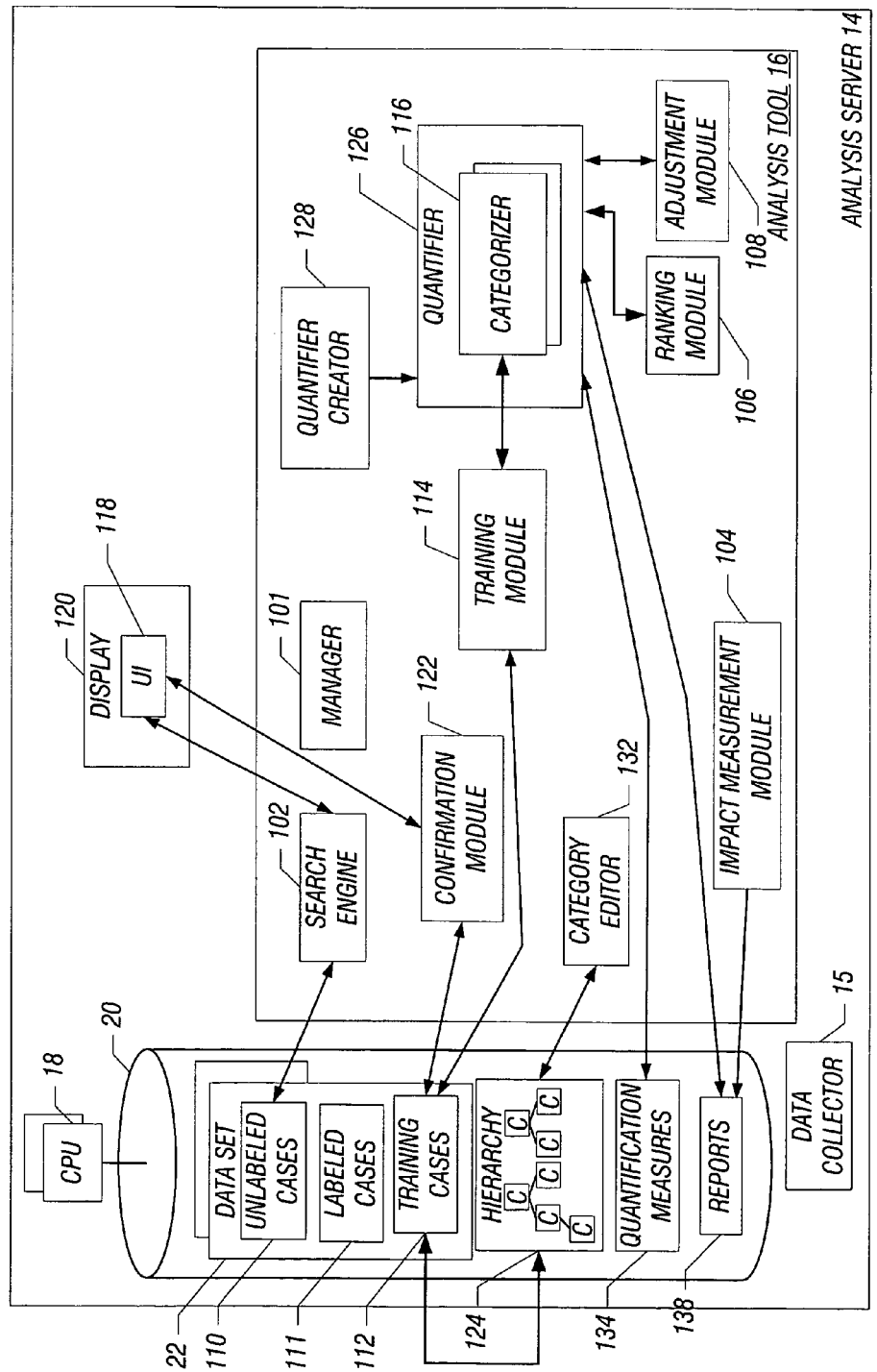
FIG. 2 is a block diagram of the analysis server of FIG. 1 that incorporates an analysis tool according to an embodiment of the invention.

FIG. 2 illustrates the components of the analysis tool 16 and content of the storage 20 in accordance with an embodiment, in greater detail. The analysis tool 16 contains various modules according to some embodiments of the invention that are executable on the CPU(s) 18. One module in the analysis tool 16 is an impact measurement module 104 that is executable on the CPU(s) 18. The impact measurement module 104 is invoked after an action or other event has occurred with respect to an issue (such as a problem) to quantify the effect of the action or other event.

Examples of actions that can be implemented with respect to a problem include changing the design of future products or implementing a fix for an existing product; creating a software patch for download by customers or for provision by retailers with existing software products; create new documentation or alter existing documentation (e.g., a "read-me" flyer); create an on-line document assessable by customers over a network to enable customers to address the problem themselves; identify existing on-line documents that can be provided to customers to help customers fix the problem; create an automated diagnostic routine to allow diagnosis of the problem and possibly suggest an appropriate solution; and create a document for use by customer support representatives to more rapidly identify a problem and to solve the problem more efficiently. Other actions are listed further below.

Examples of other events that may affect a particular problem or other issue include external events (associated with third parties) such as a new version of an operating system, upgrades of operating systems, new knowledge documentation, new hardware platforms by a third party vendor, or any other event that can directly or indirectly affect cases associated with a particular issue.

The impact measurement module 104 is used to determine an impact of an event with respect to a particular issue. The determination of impact is based on outputs provided by a quantifier 126.

A quantifier 126 in the analysis tool 16 performs quantification of cases associated with a particular issue. "Quantification" refers to the computation of one or more of the following quantification measures: (1) a quantity of cases in each category; and (2) an aggregate (e.g., sum, average, maximum, minimum, etc.) of a data field (e.g., cost of parts or time used to address the issue) associated with each of the cases in the respective category. Prior to occurrence of an action or other event, the quantifier 126 computes quantification measure(s) for cases in a first time period or window. After an action or other event has occurred, the quantifier 126 then computes further quantification measure(s) of cases in a second time window. In some embodiments, the impact measurement module 104 compares the quantification measures in the two different time windows to ascertain an impact of a fix or other event for a particular issue. The impact measurement module 104 can compare the quantification measure(s) for cases in the second time window (after the fix or other event has occurred) to either (1) actual or baseline quantification measure(s) for cases in the first time window; or (2) adjusted quantification measure(s) for cases in the first time window. An "adjusted" quantification measure refers to a measure that has either been extrapolated (such as for a future time period) or normalized (to take into account various factors). Extrapolating a quantification measure for a future time period provides a prediction of the quantification measure based on a simple trend detected over past time periods. If an extrapolated quantification measure is used, then the comparison is between the new quantification measure (computed for the second time window after the action or other event) and predicted quantification measure (the quantification measure predicted for the second time window based on a trend). In this manner, the impact measurement module 104 is able to quantify the effect of an event based on comparing what has happened after the event with what would have happened had the event not occurred.

Normalizing a quantification measure refers to normalizing based on such factors as changes in quantification measure(s) caused by marketing promotions, sales volume, seasonality, product end-of-life, installed base (e.g., installed base under support contract or installed base under warranty), and so forth. For example, the quantification measure computed in the first time window may have occurred during a time when an organization was heavily marketing a particular product. Such heavy marketing may result in a temporary increase in sales volume during the first time window. Therefore, for an accurate comparison, the quantification measure computed for the first time window is normalized to factor out the increased activity due to heavy marketing by the organization. Other types of normalization can also be performed, such as normalizing for heavier activity during holiday seasons, and so forth. Installed base under support contract represents the number of customers using a particular product or products who are signed up for a support contract. Installed base under warranty represents the number of customers using a particular product or products that is or are under warranty. In general, an "installed base" refers to some group of customers, products, services, etc., on which the analysis should focus. For example, if a special phone number exists for "elite" customers of organization (frequent customers), then the analysis to quantify the effect of an action may focus on the calls received from customers who have access to the special phone number.

Alternatively, instead of comparing quantification measures in two time windows, other embodiments can compare quantification measure in two groups separated by a criterion (ia) other than time. For example, prior to an event (e.g., a fix), products may have a first range of serial numbers. After an event, products may have a second range of serial numbers. Quantification measures computed for these two groups (first group includes products having the first range of serial numbers, and second group includes products having the second range of serial numbers) can be compared to determine the impact of the event (e.g., fix).

Although the impact measurement module 104 is depicted as being part of the analysis tool 16, it is noted that in a different implementation, the impact measurement module 104 can be part of a package that is separate from the analysis tool 16. This separate package can either be implemented on the analysis server 14 or on another system. When implemented in a separate package, the impact measurement module 104 receives quantification measures from the quantifier 126 in the analysis tool 16, and performs its impact measurement task.

The quantifier 126 in the analysis tool 16 cooperates with one or plural categorizers 116 to perform its quantification task. The categorizer(s) 116 is(are) trained by a training module 114, based on training cases 112 (including positive training sets of cases and negative training sets of cases) created based on an optional search-and-confirm mechanism. In some embodiments, the categorizer(s) 116 is(are) based on supervised machine-learning technology.

Note that, in other embodiments, the categorizer(s) 116 can be trained without using the search-and-confirm mechanism. For example, the categorizer(s) 116 can be trained using a machine-learning algorithm based on data associated with a set of training cases developed by another mechanism. A machine-learning algorithm is an algorithm that takes as input a training set of cases labeled with correct categories. The output of the machine-learning algorithm is a trained categorizer that is able to categorize or classify a case into one or more categories. Examples of machine-learning algorithms include the following: a support vector machine learning algorithm; naïve Bayes network learning algorithm; a Bayesian network learning algorithm; a neural network learning algorithm; and a decision tree learning algorithm.

The optional search-and-confirm mechanism performs a search-and-confirm procedure to develop the training cases 112. Training a categorizer refers to building or modifying a categorizer based on the training cases, including a positive training set of cases and a negative training set of cases for each category.

In accordance with some example implementations, concurrently with the optional search-and-confirm procedure for the purpose of developing categorizer training cases, new categories (such as for problems faced by an organization) can be discovered or existing categories modified. As new categories are added or existing categories modified, training cases are further developed for these new or modified categories to further train the categorizer 116.

The trained categorizer 116 is then used to categorize cases of the data set(s) 22 into one or more categories. In alternative implementations, multiple trained categorizers 116 can be used to categorize cases of the data set(s) 22 into one or more categories. As the categorizer 116 categorizes cases, quantification of the cases in each category is performed by the quantifier 126.

The quantification measures produced by the quantifier 126 allow an optional ranking module 106 in the analysis tool 16 to provide information to identify higher priority categories, based on one or more predefined criteria. Providing information to identify higher priority categories enables ranking of the categories so that an organization can properly allocate resources to more important respective issues. For example, the ranking can enable an organization to identify the top ten (or top predetermined number) problems that should be given more attention. The information identifying the higher priority categories is provided for a predetermined frame of reference, such as a predetermined time period, product line, geographic region, and so forth. In other implementations, the ranking module 106 can be omitted. Ranking the issues based on information from the ranking module 106 enables presentation of a prioritized list of issues to a user for the user to select one of the issues from this prioritized list for the purpose of identifying an action or other event with respect to the selected issue and for measuring an impact of the action or other event.

As discussed above, the analysis tool 16 effectively provides an interactive package useable by a user to efficiently and accurately identify categories, train a categorizer, categorize cases, produce quantification measure(s) for the categorized cases, provide information identifying higher priority categories, and measure impact of actions or other events. The analysis tool 16 simplifies the processes of identifying new categories for cases (unlabeled cases 110 and/or labeled cases 111) in the data set(s) 22; developing training cases for training the categorizer; training the categorizer; categorizing cases; quantifying the categorized cases; providing information identifying higher priority categories; and measuring impact of an action or other event with respect to a category.

Although the various modules depicted in FIG. 2 are part of one analysis tool 16, it is contemplated that, in other implementations, the modules can be implemented in multiple tools that are deployable in the analysis server 14 or even on other systems. Moreover, in some cases, the categorizer(s) 116, quantifier 126, ranking module 106, and/or impact measurement module 104 can be provided as an output of the analysis tool 16 for use on other data sets or for use on other systems. By being able to re-run the quantifier 126, categorizer(s) 116, ranking module 106, and impact measurement module 104 on other data sets, the quantification analysis and impact measurement analysis can be easily repeated daily, weekly, monthly, annually, and so forth. Note that although the categorizer(s) 116, quantifier 126, ranking module 106, and impact measurement module 104 are depicted as separate modules, the modules can be integrated into a single module in other implementations. Also, note that some of the modules in the analysis tool 16 can be omitted in other embodiments.

Optionally, the identification of categories is performed interactively by a user of the analysis tool 16 as the user uses the search-and-confirm mechanism of the tool 16. The search-and-confirm mechanism includes the search engine 102 and confirmation module 122. The search engine 102 enables a user to submit a query and to display a list of cases matching the search criterion or criteria in the query. A case is said to "match" a query if any information associated with the case satisfies some criterion, such as search term, in the query. A "term" or "pattern" specified by a query refers to any string, substring, regular expression, glob expression, non-textual object (e.g., audio object, video object, etc.), or any other term. A "glob expression" is an expression containing an operator indicating presence of zero or more characters (e.g., *), an arbitrary character (e.g., ?), a range of characters, or a range of strings. A case matches a search term in the query if any information associated with the case satisfies the search term in any specified manner (in other words, equality between the case information and the search term is not required, since the query can specify other forms of relationships between the case information and search term). Not all cases that match need to be used. With the confirmation module 122, the user is able to confirm or disconfirm whether each of the displayed cases belongs to a category (or plural categories).

The search engine 102 is able to receive a query from a user through the user interface 118, and to issue the query to identify cases from the data set(s) 22. The search engine 102 displays information regarding identified cases from among the unlabeled cases 110 that match the query. The displayed information regarding the identified cases is presented in the user interface 118. The user interface 118 can be a graphical user interface, according to an example implementation.

The information displayed in the user interface 118 by the search engine 102 in response to the query includes information regarding a subset of the unlabeled cases 110 that match search criterion(ia) (in the form of search terms or patterns) in the query. The user interface 118 displays a summary of each of the matching cases to provide a user with information regarding each case. The process of specifying a query and viewing results of matching cases is referred to as a "scooping" process. Following the scooping process, a "confirming" process is performed in which a user is able to confirm whether or not each of the matching cases belongs to a particular category (by selecting or deselecting displayed fields or other indicators).

User confirmation (or disconfirmation) is monitored by the confirmation module 122. Not all displayed cases need to be confirmed or disconfirmed. For cases that have been correctly matched to a category, such cases are added to a positive training set of cases. On the other hand, for cases that have been incorrectly matched, the confirmation module 122 adds such incorrectly matched cases to a negative training set of cases. The positive and negative training sets, which are part of the training cases 112 stored in the data set 22, are accessed by the training module 114 for training the categorizer 116.

The search engine 102 and confirmation module 122 thus cooperate to develop training cases 112 from cases in the data set 22 (based on user confirmation and disconfirmation), which training cases 112 are used by the training module 114 to train the categorizer 116. As noted above, the search-and-confirm mechanism (provided by the search engine 102 and confirmation module 122) can be omitted in alternative embodiments. In some alternative embodiments, the training module 114 can implement another machine-learning algorithm for developing the categorizer 116 based on an input set in which cases have been labeled as belonging to particular categories.

During the searching and confirming, a user can determine that additional categories should be added to a hierarchy 124 of categories, or existing categories in the hierarchy 124 modified. Using a category editor 132 in the analysis tool 16, the user can move, add, modify, or even delete categories (represented by the hierarchy 124 of categories stored in a storage 20). In the example hierarchy 124 depicted in FIG. 2, each box designated "C" represents a category. As depicted, a category can have subcategories, which also can have subcategories. As categories are added, deleted, or modified, additional training cases can be developed for each category, with the training module 114 training the categorizer 116 based on these additional training cases. Adding, deleting, or modifying categories (or subcategories) causes the positive and negative training sets of the training cases 112 to be modified.

The category editor 132 is responsive to user input at a user interface (UI) 118 (presented in a display monitor 120) to add categories (or subcategories), delete categories (or subcategories), or modify categories (or subcategories). In response to user input to add, delete, or modify categories (or subcategories), the category editor 132 is able to modify the hierarchy 124 of categories.

Note that, initially, there may already be a developed set of categories before the search-and-confirm procedure is started, which existing set of categories can be used as a starting or initial set of categories. In an alternative scenario, such as with a new project, no categories may exist. In this alternative scenario, the user may create one or a few categories as the starting point, or the one or few categories can be created by another technique, described further below.

In one embodiment, the categories in the hierarchy 124 of categories are in a directed acyclic graph (DAG) rather than a tree. In other words, any category in the hierarchy 124 can have not only several children, but also several parents. However, a category cannot be simultaneously an ancestor and a descendant of another category. Subcategories (associated with a particular category) are considered the children of the particular category. In alternative implementations, other structural relationships of categories can be employed.

A manager module 101 in the analysis tool 16 performs overall management operations, such as managing the storing of data (including training cases 112 and hierarchy 124 of categories) in the storage 20 and coordination among the various modules of the analysis tool 16.

As the positive and negative training sets are modified based on the user confirming and disconfirming acts, and based on modification of the hierarchy 124 of categories, the modified positive and negative training sets are propagated through the hierarchy 124 of categories to enable the training module 114 to train the categorizer 116 for the categories.

During development of the categorizer 116, the quantifier 126 is also created by a quantifier creator module 128 in the analysis tool 16. The quantifier 126 can be in any format, such as an Extensible Markup Language (XML) format, C code format, or any other format. In the arrangement of FIG. 1, the categorizer(s) 116 is(are) part of the quantifier 126. However, in other embodiments, the quantifier 126 and categorizer(s) 116 are separate modules. In either case, the quantifier 126 cooperates with the categorizer(s) 116 to perform automated quantification of the cases. In this manner, manual quantification (which can be time intensive, inaccurate, and expensive) is replaced with quantification by the quantifier 126 using categorizer(s) 116 trained according to some embodiments of the invention.

The quantification performed by the quantifier 126 includes computing, for one or more of the categories in the hierarchy 124 of categories, a quantification measure that represents the number of cases in each category. Alternatively, the quantifier 126 is able to generate another quantification measure, such as a sum or some other aggregate of a data field associated with the cases that belong to each category. As an example, the quantification can represent a measure (e.g., sum) of one or more of the following: the duration of calls, cost of repair, amount of time to resolve the calls, amount of lost revenue, an amount of money to resolve calls; amount of lost revenue due to calls; a degree of customer aggravation; an amount of time spent by customers before initiating a call; an amount of time spent by customers during the call; an amount of time spent diagnosing or resolving cases; an amount of money spent by customers; an amount of money spent interacting with customers; an amount of money spent diagnosing or resolving the cases; and a number of customers who declined to pay for a call; and so forth.

Other examples of aggregation include an average or mean, a standard deviation, a 95% (or other percentage level) confidence interval, a variance, a minimum, a maximum, a median, a mode, a geometric mean, a harmonic mean, a percentile rank, an ordinal statistic, or other statistic of the values in the data field associated with the cases or a value computed based on fitting a model to the values in the data field associated with the cases. The data field of a case can contain a single value or a collection of values, or the data field can be a value or collection of values computed from other values associated with the case. In some embodiments the aggregate may involve a plurality of data fields associated with each case. The quantification measures computed by the quantifier 126 are stored as quantification measures 134 in the storage 20.

Note that the quantification measures computed by the quantifier 126 are estimated measures in light of the fact that the categorization performed by a categorizer 116 is often not absolutely accurate. For example, the accuracy of a trained categorizer can be impacted by the quality of training cases used to train the categorizer. As explained further below, to compensate for inaccuracies of the categorizer 116, calibration (or adjustment) of the quantifier 126 is performed based on some indication of the ability of the categorizer 116 to categorize cases in a data set.

The quantifier 126 is able to display the quantification measures it computes either numerically, textually, or graphically. Also, the quantifier 126 is able to generate one or more reports 138 that present these quantifications. The reports 138 optionally also provide comparative quantifications, such as providing a comparison of cases in different data sets or in different partitions of one data set.

Moreover, in some embodiments, the analysis tool 16 can provide the quantifier 126, along with one or plural associated categorizer(s) 116, as an output. The output quantifier 126 and categorizer(s) 116 is useable on other data sets to perform categorization and quantification on the other data sets. By being able to re-run the quantifier 126 and categorizer(s) 116 on other data sets, no additional substantial manual labor is involved in applying the quantifier 126 to the other data sets. For example, using the output quantifier 126, the quantification analysis can be easily repeated daily, weekly, monthly, annually, and so forth.

The analysis tool 16 also includes the ranking module 106 for providing information to identify higher priority categories based on quantification measure(s) provided by the quantifier 126. Providing information to identify higher priority categories includes providing information to identifying some order of the categories (or to rank the categories) based on predetermined one or more criteria. The information identifying the higher priority categories are presented in the report(s) 138.

Identifying priority of categories can be based on one or more of the following criteria, as examples: the number of calls in each category; the amount of time involved in resolving calls in the category; the amount of money spent by the organization to resolve calls in the category; the amount of time, money, or aggravation of the customer (customer dissatisfaction) in resolving calls in the category; the estimated amount of lost future revenue due to calls in the category; and the estimated number of customers having the problem associated with the category who simply gave up rather than call (lost customers). Note that the above criteria are provided for the purpose of example. In other embodiments, other criteria can be used by the ranking module 106.

The details of the report presented by the ranking module 106 include the quantification measures provided by the quantifier 126. As noted above, the quantification measures include a number of cases in each category and/or an aggregate of some data field associated with the cases. In addition to providing a quantification of higher priority issues, the report also enables a user to obtain sub-issues (in the form of subcategories), detailed information regarding each issue, and example cases for each issue.

Each quantification measure provided in the report can be the actual quantification measure produced by the quantifier 126, or alternatively, can be an adjusted (extrapolated or normalized) value produced by an adjustment module 108. Adjusted quantification measures include quantification measures extrapolated into the future, which can be based on a simple trend of the quantification measures over a past number of weeks, months, or other time periods. Alternatively, adjusted quantification measures include quantification measures normalized based on sales numbers and trends, marketing promotions, seasonal buying patterns, product end-of-life information, product introduction information, and so forth. The ranking module 106 can take into account the adjusted quantification measures from the adjustment module 108 when producing the ranking of categories in a report 138. In some cases, adjusted quantification measures allow the ranking module 106 to determine that a category that may be a major issue currently may not be a major issue in the future, based on a trend, a product close to end-of-life, and so forth. The ranking module 106 is also able to compare categories in different time horizons based on the expected amount of time involved in addressing each category. Also, the adjusted quantification measure(s) can be used by the impact measurement module 104 for purposes of measuring impact of an action or other event.

Figure 3:
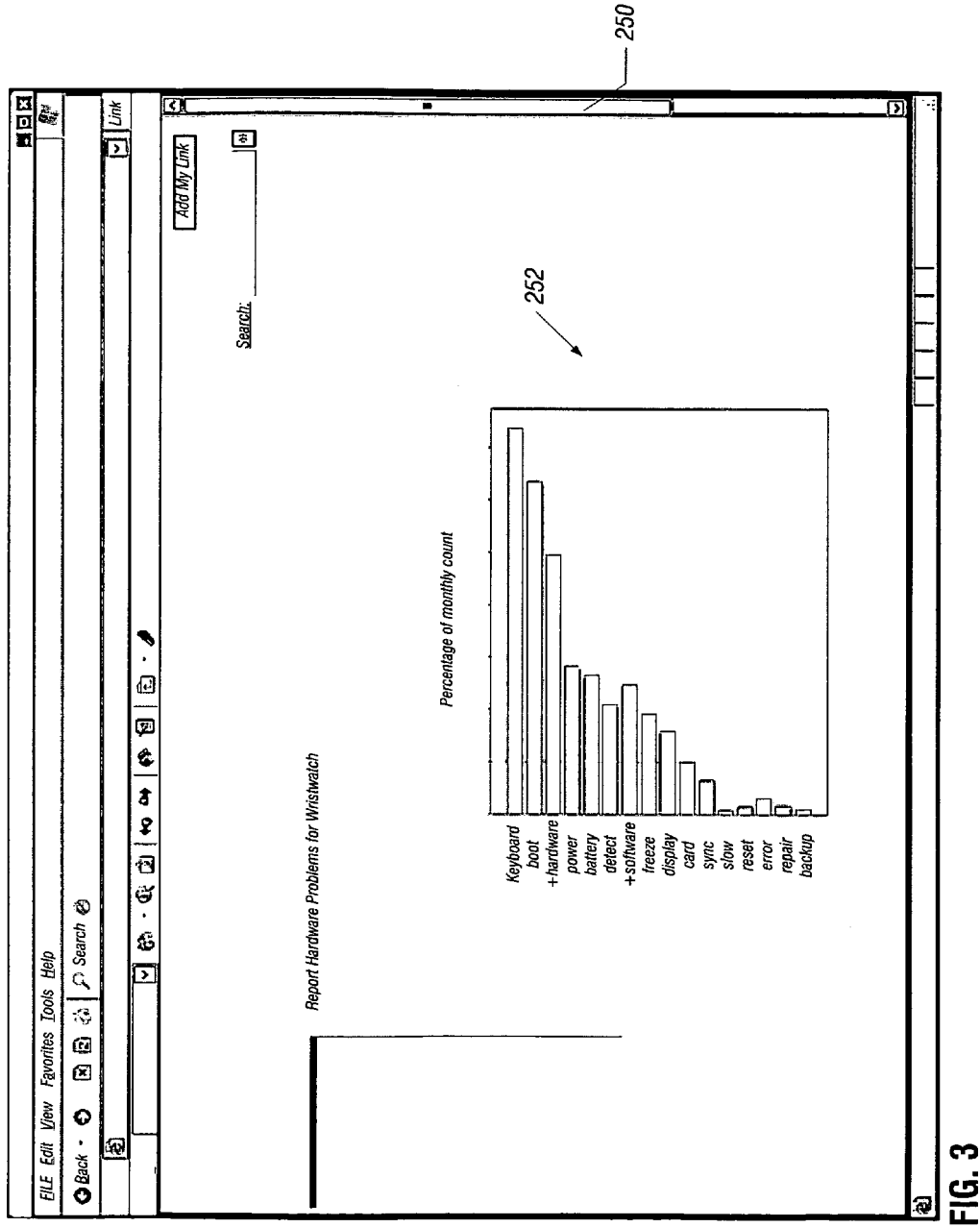
FIGS. 3 and 4 illustrate graphical user interface screens for presenting information associated with the analysis tool, according to an embodiment.

FIG. 3 illustrates an example of a GUI screen 250 produced by the optional ranking module 106 (FIG. 2) that produces a ranking of categories in the form of a bar chart 252. Each bar in the bar chart 252 corresponds to a category. In the example of FIG. 3, the length of each bar in the bar chart 252 represents a percentage of the monthly count of cases in each category. In the bar chart 252, the "keyboard" category is associated with the highest percentage, whereas the "backup" category is associated with the lowest percentage. The categories in FIG. 3 are listed according to their respective percentages, which is one form of ranking.

In the bar chart 252, the "hardware" category and "software" category each has a "+" icon that is user selectable to enable the user to drill further into the respective categories to determine additional information regarding subcategories. Although not depicted in FIG. 3, many other types of information can be displayed for the listed categories. Also, instead of the bar chart format, the output can be in another format (such as text format).

Figure 4:
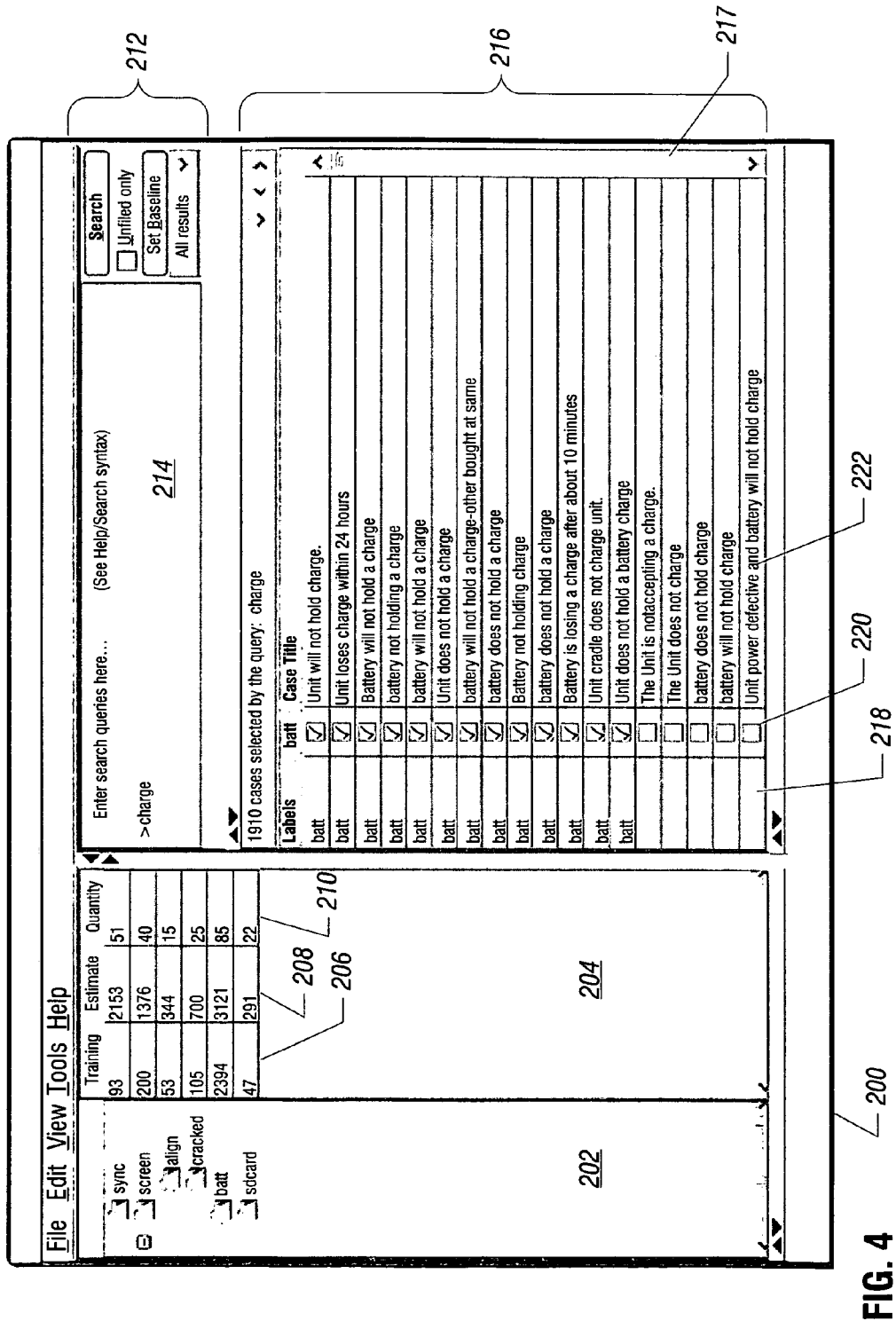

FIG. 4 illustrates an example of another GUI screen 200 that can be displayed in the user interface 118 (FIG. 2), for performing an optional search-and-confirm procedure according to some embodiments. The content of the GUI screen 200 is provided by one or more of the search engine 102, confirmation module 122, manager module 101, training module 114, category editor 132, categorizer 116, and quantifier 126.

The GUI screen 200 includes a first frame 202 that displays the hierarchy of categories (also referred to as "classmap") that is being built using the analysis tool 16 of FIG. 2. In the example depicted in FIG. 4, the four main categories include "sync," "screen," "batt," and "sdcard." Note that any of these four categories can include subcategories. For example, the "screen" category has subcategories. Examples of subcategories of the "screen" category include the "cracked" subcategory, and the "align" subcategory. The subcategories can further include subcategories to any desired depth.

The GUI screen 200 also includes a second frame 204 with a "training" column 206 to display the number of cases that have been identified by a user (either directly or by inference) as being positive cases for a given category. The "Training" column 206 lists the number of cases for each of the "sync," "screen," "batt," and "sdcard" categories. For example, in the "Training" column 206, the "sync" category has 93 cases, the "screen" category has 200 cases, the "batt" category has 2,394 cases, and the "sdcard" category has 47 cases.

Another column in the second frame 204 is an "Estimate" column 208, which displays the estimated number of cases identified by the quantifier 126 as belonging to each of the categories and subcategories. A third "Quantity" column 210 lists an estimated sum of some data field of the cases in each category, such as time spent on cases that belong in the category or cost of handling the cases in the category. The values in the "Quantity" column 210 are also provided by the quantifier 126. As other examples, the "Quantity" column 210 can indicate costs or percentages of volume of cases.

Another optional column in the second frame 204 can indicate the perceived quality of the current categorizer with respect to each particular category. Examples of information pertaining to the measure of the quality of the categorizer 116 that has been trained using training information developed according to some embodiments includes: a true positive rate (the likelihood that an item in a category will be identified by the categorizer to be in the category); a false negative rate (the likelihood that an item in a category will be identified by the categorizer to be not in the category); a true negative rate (the likelihood that an item that is not in a category will be identified by the categorizer to be not in the category); a false positive rate (the likelihood that an item that is not in a category will be identified by the categorizer to be in the category); an accuracy measure (the likelihood that an item will be correctly identified to be or not to be in a category); a recall measure (same as true positive rate); a precision measure (the likelihood that an item identified to be in a category actually is in the category); a bi-normal separation measure (a measure of the separation between the true positive rate and the false positive rate); an information gain measure (a measure of the decrease in entropy due to the categorizer); a lift measure (a measure of an increase in, e.g., response rate if only the cases the categorizer is most confident about are processed); a measure of stability under cross-validation (measure of the likelihood that the categorizer has or has not overfit the training information by learning to recognize individual cases rather than learning generalities that apply to unseen data); a measure of an area under an ROC (receiver operating characteristic) curve (area under a curve that is a plot of true positive rate versus false positive rate for different threshold values for a categorizer); a number of training cases; a percentage of target training size (same as number of training cases, except with the added notion that a user has indicated a desire to see a minimum number of cases for every category); an F-measure (a parameterized combination of precision and recall); a total cost (an expected aggregate cost over analyzed cases considering separate individual costs for the true positives, true negatives, false positives, and false negatives); and an average cost (similar to total cost, except averaged over the number of cases).

A search frame 212 is also displayed in the GUI screen 200. The search frame 212 includes a search area 214 in which a user can enter a query for performing the scooping process. As part of the scooping process, the user-provided query is submitted to the search engine 102 (FIG. 2) to retrieve a number of cases that will be displayed in a display frame 216. In the example shown in FIG. 4, the query contains the search term "charge," which means "find cases that contain a word in a case title or elsewhere that contains the word charge."

The display frame 216 displays a summary (e.g., title) of some or each of the cases identified by the search based on the query entered in the search frame 212. Note that each case is associated with several pieces of information, with the title being one of the pieces. In other implementations, other pieces of information associated with the cases can be displayed. In the example of FIG. 4, the leftmost column 218 of the display frame 216 indicates the category (in text form) of each of the corresponding cases. In a second column 220 of the display frame 216, user-selectable boxes are provided to allow a user to confirm whether or not the corresponding cases belong to the category displayed, in this case, the "batt" category. The user-selectable boxes are clickable by a user to perform confirmation or disconfirmation. Also, the categorizer 116 can provide an initial guess as to whether or not the displayed cases belong to the category (by displaying a check mark or leaving the user-selectable box blank).

If the result cases do not fit in one page, a scroll bar 217 is provided to enable the user to scroll to the remaining cases. Alternatively, a user may specify that the GUI screen 200 displays a set of randomly selected cases that fit within the display frame 216, such that the scroll bar 217 would not have to be used.

In the third column 222 of the display frame 216, a summary of the case, such as the case title, is illustrated. For example, the summary provided can have been previously entered by a customer support representative when answering customer calls. Even though the displayed summaries may contain mis-spellings, grammatical errors, and abbreviations, a user looking at each summary can quickly ascertain whether each respective case is associated with the category in question.

Note that each of the case titles displayed in the third column 222 of the display frame 216 contains the word "charge." Based on the displayed case title, a user can select or de-select each user-selectable box in the second column 220. In other implementations, other types of summaries can be displayed in the third column 222 to provide information that the user can use to select or de-select boxes in the second column 220. Selection of a box indicates that the user has confirmed that the particular case belongs to the category. On the other hand, when a user de-selects a box in the second column 220, that is an indication that the corresponding case does not belong to the category in question (that is, the user has disconfirmed that the case belongs to the category).

In a different embodiment, instead of displaying just one category, the display frame 216 can display multiple categories with fields that are user-selectable to confirm or disconfirm whether a case belongs to the categories. A confirmed case can be added to a positive training set, while a disconfirmed case can be added to a negative training set. The positive and negative training sets are used to train the categorizer.

As a user labels cases as belonging (or not belonging) to particular categories based on input to the confirmation module 122, training cases 112 (positive and/or negative training cases), are added. As the training cases 112 are added, the categorizer 116 is trained concurrently. The training of the categorizer 116 as positive training cases or negative training cases are added can be performed in the background (according to some embodiments) so that the training (or retraining) of the categorizer 116 does not interfere with the search and confirm processes used for identifying training cases. The trained categorizer is installed atomically once the training is complete. If the user makes changes to the categories while the categorizer is training, the training can be stopped and restarted with the modified categories. Note that the term "training" refers to either the first training of a categorizer or a retraining of the categorizer.

Also, as categories are added, modified, and/or deleted, the categories displayed in the first frame 202 are changed by the category editor 132 (FIG. 2). During the search, confirm, and training processes, the "Estimate" and "Quantity" columns 208 and 210 in the second frame 204 are also continually updated by the quantifier 126.

FIGS. 5A-5H show flow diagrams of processes that involve a search-and-confirm procedure, training procedure, a quantifying procedure, a ranking procedure, and an impact measurement procedure, according to an embodiment.

Figure 5A:
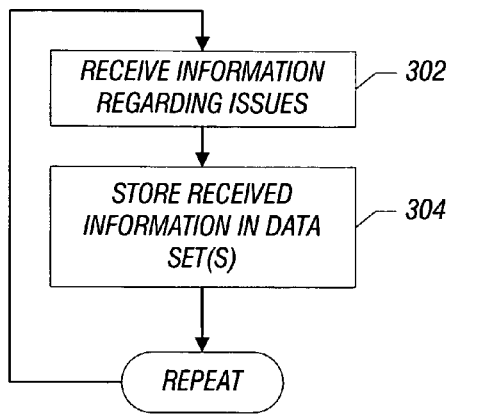
FIGS. 5A-5H are flow diagrams of processes performed by the analysis tool according to an embodiment.

As shown in FIG. 5A, the data collector 15 (FIG. 2) receives (at 302) information regarding various issues, which information is received from one or plural call agent stations 10 (FIG. 1) or from other data sources. The data collector 15 stores (at 304) information regarding issues in a data set (or plural data sets).

Examples of the types of information that are received and stored include information such as the time and duration of call; information about the product being called about, replacement parts ordered, compensation offered, or repair people sent; information automatically gathered from a computer of a customer; uniform resource locators (URL(s)) or other resources visited and documents consulted in attempting to solve the problem; linked information on the demographics of the customer (e.g., location, age, gender, technological sophistication, loyalty, generated revenue, etc.); call agent-entered description of the state-of-mind of the customer; description of interaction between call agents and customers; call agent selection of a category or problem based on a call; transcripts or recordings of on-line chat sessions or telephone conversations; call agent-written short summaries of a problem; customer e-mail messages; records of pages visited on a web site (such as on-line documents viewed by customer or call agent); outputs from a diagnostic program; data stored in a database (e.g., data relating to a prior support call, information relating to a purchase, and demographic information of a customer); computer files received from a customer; survey data; data received by a monitoring device; and others.

Steps 302 and 304 are repeated as additional information regarding issues are received.

Next, an optional search-and-confirm procedure (FIGS. 5B-5C) is performed for the purpose of developing training cases for categories associated with the unlabeled cases. The training cases is used to train one or plural categorizers 116 (FIG. 2).

The analysis tool 16 reads an initial hierarchy of categories (at 310). One way of creating the initial hierarchy categories is based on user input. In one scenario where training cases are to be developed for a new project, a set of categories may not yet exist. In this scenario, a user can create one or a few categories as the starting point. An expert may create the categories based on a preconceived notion of the relevant categories (such as problems) associated with a particular project. Alternatively, the expert may create the one or few categories based on prior experience or common knowledge of the expert. For example, it may be well known that a product has problems with battery life, wireless connectivity, and keys following off. In a second approach, an expert may "eyeball" cases by scooping random samples and seeing which problems jump out at the expert. A user or expert can add, delete, or modify categories using the category editor 126 (FIG. 2).

Alternatively, instead of relying on a human user or expert, an automated module in the analysis tool 16, can be used to examine the unlabeled cases 110 and determine based on this examination one or plural possible categories. For example, one technique that can be used by such a module is a cluster-detecting technique based on a clustering algorithm to identify groupings of cases. These groupings of cases identified are reviewed by a user or expert to determine which categories are appropriate to add to an initial set of categories. Note that this initial set of categories provided (at 310) does not have to be highly accurate categories, nor do these categories have to survive the process of developing the categories. The initial set of categories merely provides a starting point.

In a different scenario, there may already be a set of extant categories that can be used as a starting point for further development of training cases.

After one or a few initial categories have been identified (at 319) for the purpose of searching and confirming, the scooping process can begin. To start the scooping process, a user enters a query relating to a category into the search area 214 of the GUI screen 200 (FIG. 4). A query relates to a category if the query contains search term(s) for finding cases that belong to the category. Note that a query relating to one category can also relate to other categories as well; in other words, in some scenarios, a query can contain search terms to find cases belonging to multiple categories. The query, received (at 320) by the search engine 102 (FIG. 2), can be in any of a number of formats, including a Boolean expression, a structured query language (SQL) query, or some other type of query. The search engine 102 can also have the capability of matching search terms specified by the query with related terms, such as synonyms. The related terms that are to be matched to the search term specified in the query can be grouped into a collection of terms or other patterns. A case containing a term or pattern that matches any of the collection of terms or patterns is considered to be a match by the search engine 102.

In response to the query, the search engine 102 identifies (at 322) the matching set of cases and displays (at 324) the identified set of cases in the user interface 118 (FIG. 2). As depicted in the example GUI screen 200 of FIG. 4, the displayed summary of the matching cases includes numbers, dates, and short strings, with a single line per case, in a table. Alternatively, the identified cases may be displayed in two-dimensional or three-dimensional graphs, or in other formats. Optionally, a user can also access information in addition to the displayed information, such as by clicking on a link. Additionally, the displayed information includes the category (or categories) that a user (or the categorizer) has associated with the case (either based on an earlier training set or based on a prediction by the categorizer).

As noted above, the submission of the query, identification of cases matching the query, and the display of the cases is part of the scooping process. Typically, the scooping process has been performed with a hypothesis in the form of "cases that match this query should be training examples for category C."

After the cases have been displayed by the search engine 102, then the confirmation module 122 can receive (at 326) user confirmation or disconfirmation. For example, some of the cases may have been identified or inferred as being or not being in the category (or categories) in question. In the example of FIG. 4, some of the user-selectable boxes in column 220 of the display frame 116 can have been checked based on this previous identification or inference.

In an embodiment, the categorizer can determine whether a matching case should be indicated as belonging to a category by computing a confidence indication. The confidence indication is compared to a predefined threshold, and if the confidence indication is greater than the predefined threshold, the categorizer identifies the matching case as belonging to the category.

The user next goes through the displayed cases and either confirms or disconfirms by respectively checking the box (or leaving the box checked) or un-checking the box (or leaving the box un-checked) in the column 220. Note that a case can belong to more than one category, so that a scoop for one category may return cases that have already been labeled as belonging to another category. Also, note that check boxes constitute one example implementation for confirming or disconfirming that a case belongs to a category. There are numerous other techniques in other implementations, including techniques to check plural boxes at the same time.

For those cases that have been indicated as belong to the category in question (based on user selection of the box in column 220 in FIG. 4), the confirmation module 122 modifies (at 328) the positive training set by adding such cases to the positive training set for the category. For those cases that have been incorrectly matched, which are cases that the categorizer 116 initially identified as belonging to the category but which the user has disconfirmed as belonging to the category, the confirmation module 122 modifies (at 328) the negative training set by adding such cases to the negative training set for the category. Optionally, when the user disconfirms a case as belonging to a first category, the user can confirm that the case belongs to another category (although the user does not have to). The positive training set of cases and negative training set of cases are part of the training cases 112 in FIG. 2. Note that there can be plural sets of positive cases and plural sets of negative cases for respective categories.

Steps 320-328 are repeated to develop training cases for other categories or to more fully develop training cases for a current category.

Figure 5C:
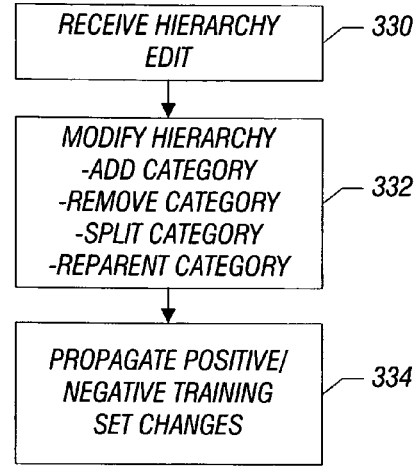
Figure 5B:
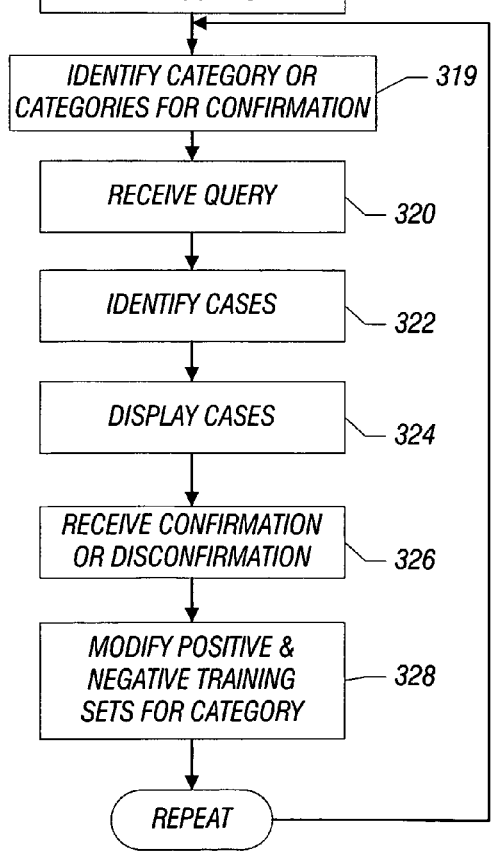

In an alternative embodiment where the search-and-confirm procedure of FIG. 5B is not used, a machine-learning algorithm can be used for producing a trained categorizer based on training cases developed using another mechanism.

As part of the process of confirming or disconfirming cases, the user may realize that a new category should be created. In the example depicted in FIG. 4, the user can do this using one of the menu items of the GUI screen 200, such as the "File," "Edit," or "Tools" menu items, or some other control element in the GUI screen 200. As shown in FIG. 5C, the category editor 126 receives (at 330) an edit input (through the GUI screen 200) regarding a newly created category (or subcategory), a modified category (or subcategory), or a deleted category (or subcategory). In response to user input adding a new category (or subcategory), modifying a category (or subcategory), or deleting a category (or subcategory), the category editor 126 modifies (at 332) the hierarchy 124 of categories (FIG. 2). In the present discussion, it is noted that adding, deleting, or modifying a category refers to adding, deleting, or modifying a category and/or a subcategory. The user can also split a category (into multiple categories) or preparent a category (indicate one category as being a parent of another category).

The modification of the hierarchy 124 of categories can result in changes of the positive and negative training sets, which changes are propagated (at 334).

Since any added or modified category is based on a user's examination of the summaries of cases listed in response to the query, the added or modified category is likely to be semantically meaningful (the label for the category or subcategory is descriptive of the corresponding problem or other event or item). Also, the set of categories created is not biased by any requirement that all cases have to be labeled or that all cases have to be assigned to a single category.

Figure 5D:
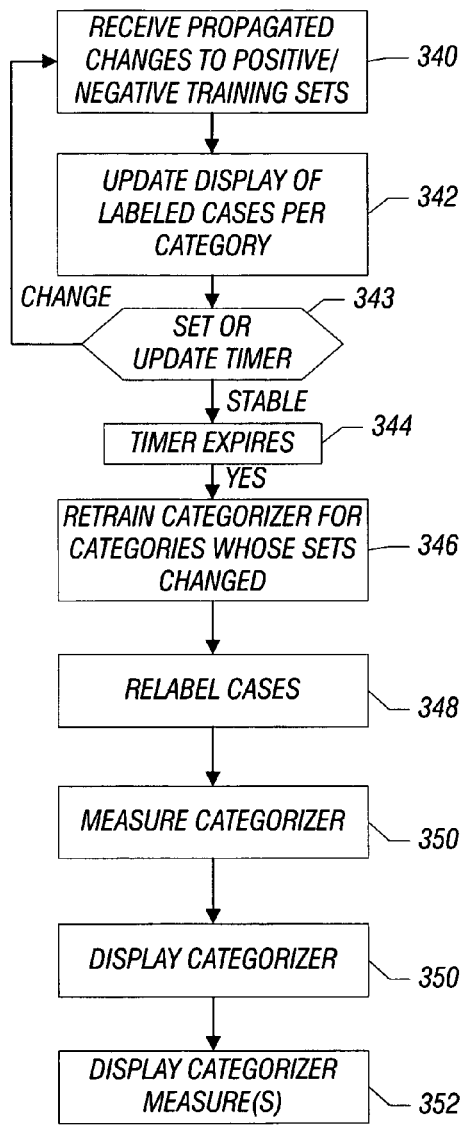

As discussed, as the user performs confirm/disconfirm and as categories or subcategories are added/modified/deleted, changes occur in the positive and negative training sets, which are propagated (at 340) through the hierarchy 124 of categories, as depicted in FIG. 5D. The display of the number of cases per category is updated (at 342) in the column 208 of the frame 204 (FIG. 4). Optionally, a timer can be set to expire (at 344) after some period of stability during which the training cases 112 have not changed.

As the training cases 112 are being updated by the scooping and confirming processes described above, the categorizer 116 is trained (at 346) in the background for categories whose positive or training sets have changed. Optionally, the retraining (at 346) can be delayed, by use of a timer involving optional steps 343 and 344. The timer is set or updated (at 343) to expire after a predetermined amount of time. Any change to the training cases will cause the process to loop back to step 340 (which will cause the timer to again be set or updated at 343). After some period of stability (a period during which no changes occur) has been detected, the timer expires (at 344), which allows the categorizer retraining (at 346) to be performed. Checking for stability at 344 avoids the situation where many successive changes in the positive and training sets in a short period of time caused by user confirming/disconfirming or category modification causes the retraining to restart many times. The retraining of the categorizer 116 can occur generally concurrently with the scooping and confirming processes so that the user can continue to perform the scooping and confirming processes even while the categorizer is being trained, subject to the training module 114 (optionally) waiting for expiration of the timer to ensure some period of stability. An output provided by the scooping process, confirming process, and training process described above is a categorizer, or plural categorizers.

The retrained categorizer is invoked to re-categorize or relabel (at 348) the cases 112. Also, the quality of categorization or labeling performed by the categorizer can be determined (at 350), and a measure of this quality can be displayed (at 352). The quality measures of a categorizer are listed above.

Steps 340-352 are repeated as positive and/or negative training sets are modified for the various categories.

Figure 5E:
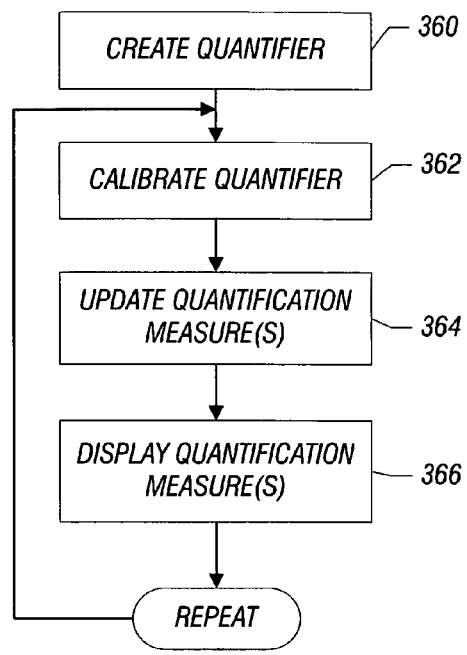

As depicted in FIG. 5E, at some point (which can be during or after the categorizer(s) has been trained and has been invoked to categorize cases in the one or more data sets 22), the quantifier 126 is created (at 360). The quantifier 126 is also calibrated (at 362) to take into account any inaccuracies present in the categorizer 116. As noted above, a categorizer usually does not perform categorization of cases with perfect accuracy. An indication of quality of a categorizer that has been trained is provided by one or more of the quality measures listed above. The quantifier 126 is calibrated based on the quality measures.

To calibrate the quantifier 126 with respect to a category C, the analysis tool 16 determines the fraction (TPR) of the time that the categorizer is correct when presented with a case that should be categorized in a category C (also referred to as the true positive rate), and the fraction (FPR) of the time that the categorizer is wrong when presented with a case that should not be categorized in the category C (also referred to as the false positive rate). Assuming that a data set includes a total of T cases, of which N cases have been categorized in the category C, then the calibration to be performed by the calibrated quantifier 126 on the value N is as follows:

$$N'=(N-FPR \cdot T)/(TPR-FPR),$$

where N' is the calibrated N value.

Similar fractions representing true positive rates and false positive rates are also maintained for the other categories to enable calibration of the quantity values for other categories. Other techniques for calibrating a quantifier/categorizer are described in U.S. patent application entitled "A Method of, and System for, Classification Count Adjustment," filed by George H. Forman et al., on Mar. 14, 2005.

In other embodiments, any other technique of calibrating a quantifier or adjusting its output quantification, especially by observing the behavior of its underlying categorizer(s), may also be used.

In yet another calibration technique, a score associated with each of a group of cases is obtained from the categorizer. A statistical distribution is computed based on the scores. The quantification measure is adjusted based on the statistical distribution.

The calibrated quantifier 126 is used to update (at 364) quantification measure(s) for each of the categories. The calibrated quantifier 126 produces calibrated quantification measure(s). The categorizer(s) 116 associated with the quantifier 126 provides information regarding the categorized cases to the quantifier 126 to enable the quantifier 126 to produce the quantification measure(s). Note that the quantification process can proceed concurrently with the search-and-confirm and the training processes discussed above. Thus, the analysis tool 16 may present running estimate(s) of the quantification measure(s) in each category. The quantifier 126 displays (at 366) the updated quantification measures, such as estimated number of cases and quantity estimates (columns 208 and 210 in the frame 204 of FIG. 4).

Steps 362-366 are repeated to continually update quantification measure(s) as more cases are received and the categorizer 116 is retrained.

Figures 5F, 5H:
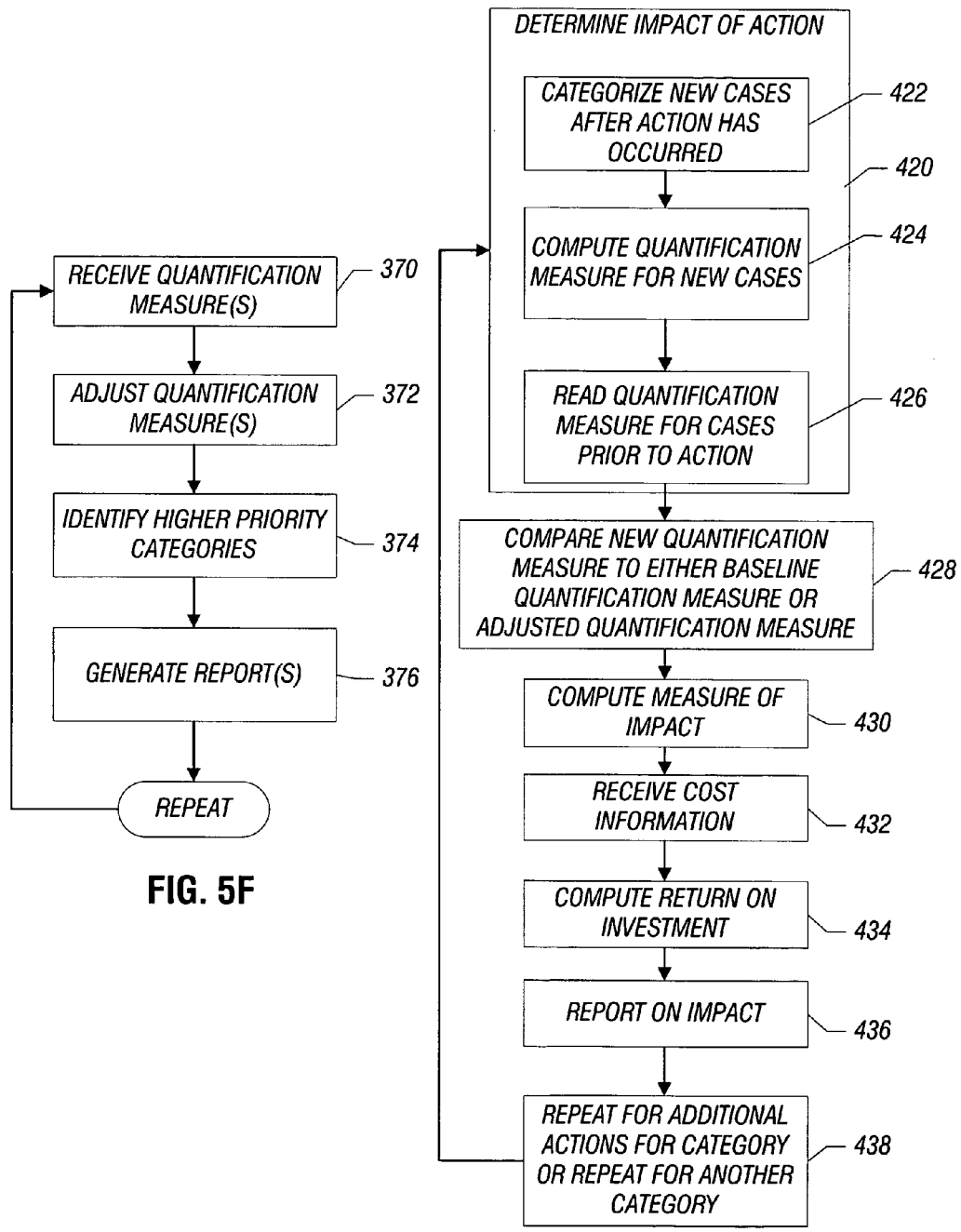

As shown in FIG. 5F, the optional ranking module 106 receives (at 370) the quantification measure(s) generated by the quantifier 126. Identification of higher priority categories can be based on the received quantification measure(s). For example, a category having a larger number of cases can be ranked higher than a category having a lower number of cases. Alternatively, a category associated with a higher aggregate number (e.g., hours spent resolving calls, estimated lost revenue, etc.) can be ranked higher than another category with a lower aggregate number.

Optionally, for more accurate ranking, the ranking module 106 also receives (at 372) adjusted quantification measure(s) (extrapolated or normalized quantification measure(s)) from the adjustment module 108. Extrapolation can be based on a simple trend, such as a trend detected over past time periods (e.g., weeks, months). The extrapolated quantification measures represent quantification measure predicted for a future time period based on the detected trend. The adjusted quantification measure(s) can also include normalized quantification measure(s) based on factors such as sales numbers and trends, marketing promotions, seasonal buying patterns, product end-of-life information, product introduction information, and so forth. For example, a larger number of calls can result from a marketing promotion for a given time period. Thus, such larger number of calls should be normalized to factor out the increase in the number of calls due to increased sales volumes due to the marketing promotion.

A benefit of using adjusted quantification measure(s) for identifying higher priority categories is that categories that may appear currently to be major issues may not be major issues in the future or after normalizing the measure(s) to account for various factors.

Based on the actual quantification measure(s) from the quantifier 126 or the adjusted quantification measure(s) from the adjustment module 108, the ranking module 106 provides information to identify higher priority categories (at 374). As an example, the ranking module 106 can provide information identifying the top ten (or other number of) categories that represent problems that should be addressed (e.g., categories associated with highest quantification measures).

The ranking module 106 generates (at 376) a report (or multiple reports) 138 that lists the ranked categories. The report(s) 138 can be in graphical, textual, or in any format, as discussed above. The report with the ranked categories effectively provides a prioritized list of categories from which the user can select for impact measurement with respect to an action or other event. As noted above, this report with a ranked list of categories is optional and can be omitted in other embodiments. The report(s) 138 can also be interactive report(s), such as in web page format, to enable a user to drill down to obtain various information relating to the issues identified in the report—e.g., quantification measure(s), information regarding sub-issues, detailed information regarding the issues, example cases, and so forth.

The quantification measures provided in the report(s) 138 are estimated measures that provide indications of magnitudes associated with various categories (e.g., magnitude of problems, etc.). Also, the presented quantification measures in the report(s) 138 can be predictions of what the quantification measures will be for the various categories in a future time period. The predicted quantification measures can be based on extrapolating observed quantification measures into the future, which can be based on linear regression fitting, as an example.

The content of a report can optionally be presented in a document containing information indicated by one or more of the following parameters: a selection criterion for categories to display; a desired depth to display in a hierarchy of problems; an ordering criterion used to rank categories; a category to focus on; a set of information related to a category to display; a selection of a presentation format; and a selection of a data set to use as the first data set. The document can be interactive to provide a user with the ability to dynamically alter one or more of the parameters. The document can be communicated to another computer or device over a computer network.

The report(s) generated by the ranking module 106 can also present information regarding a subset of cases within a category. For example, a report may be focused on a particular product model, a particular geographic region (e.g., state, country), demographic information of customers, incident dates, purchase dates, product introduction dates, and product manufacture dates. This enables a user of the analysis tool 16 to determine quantification measures and other information relating to the subset of cases. As an example, the user may realize that a particular model or geographic or user sophistication level has a relatively greater number or fewer instances of a particular problem, which information can point the way to a solution.

Also, a user may select that the report contains information for multiple subsets of cases. The information (such as ranking information and quantification measures) can be provided in the report for the multiple subsets to enable comparison by a user of the relative magnitudes of the plural subsets of cases.

The report(s) generated can also show information that changes over time. For example, a graph for a current set of data can be overlaid or presented next to graphs produced for cases in earlier time periods. In fact, the output quantifier 126 produced by the analysis tool 16 can be used to process earlier data in other data sets for more accurate comparison with current data.

Steps 370-376 are repeated as more quantification measure(s) is(are) received.

Figure 5G:
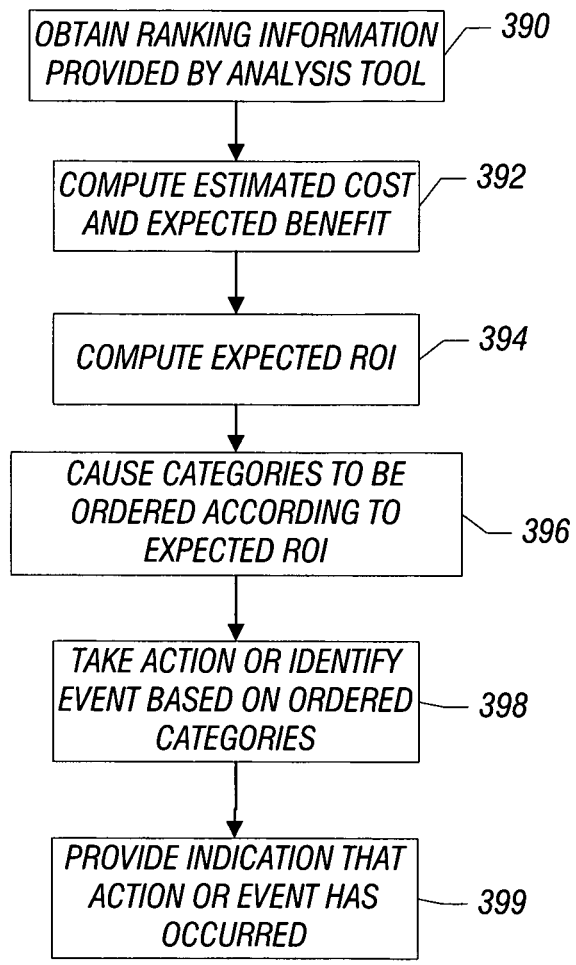

Based on output provided by the ranking module 106, such as in the form of the report(s) generated at 376, an organization or user can take an action with respect to higher priority categories (such as to take action to fix a problem or to address some other issue). As shown in FIG. 5G, the organization or user obtains (at 390) the ranking information from the report(s) provided by the analysis tool 16. The ranking information is associated with quantification measures that provide indications of magnitudes of the various categories. Optionally, the quantification measures can be predicted quantification measures for a future time period.

For categories associated with quantification measures above some predefined threshold (e.g., number of calls greater than a predefined number, total amount of time to resolve the calls greater than a predefined time, total amount of lost revenue greater than a predefined amount, and so forth), the organization or user obtains (at 392) computations of the following: (1) the estimated cost (related to labor costs associated with the amount of time involved in addressing the category, parts cost, etc.) to address the issue associated with each of such categories; and (2) the expected benefit of taking an action (e.g., cost savings, increased revenue, etc.). The computations can be calculated manually or in an automated fashion using a module of the analysis tool 16 or by some other software module.

Next, the organization or user obtains (at 394) computations of the expected return-on-investment (ROI) for addressing each of the categories. To calculate the expected ROI, expected cost information relating to an action taken with respect to a category is received. Cost information includes any or some combination of the following: labor cost to implement a product fix; material cost to implement the product fix; labor cost related to time spent creating documentation; and so forth. The expected ROI is computed based on a value (e.g., monetary value), such as cost savings, increased revenue, increased customer satisfaction, or some other benefit, that can be expected from addressing the issue associated with the category and the cost of the action to address the issue.

The expected improvement in customer satisfaction results from taking an action with respect to a particular category. For example, customer satisfaction can be improved if call agents responding to customer complaints or inquiries can answer such complaints or inquiries more quickly. Other types of actions can also improve customer satisfaction, such as adding equipment to improve access times or availability of servers (e.g., web servers), providing documentation to allow customers to more easily use a product, and so forth.

Next, the organization or user causes (at 396) the categories to be ordered (in a list) according to either expected ROI. The organization or user then takes action or identifies an event (at 398) based on the ordered list to address issues associated with one or more of the categories. The categories for which the organization or user takes action or identifies an event can be based on the overall budget available to the organization or user, or based on a prediction of a magnitude of further deterioration if an issue associated with the category is not addressed as compared to amount of savings expected from addressing the issue. The organization or user can choose to ignore categories that are too small to justify expending resources to address.

Examples of actions that can be taken with respect to a category include one or more of: allocating a sum of money (or otherwise defining a budget); allocating a physical resource (e.g., equipment); hiring a person; assigning a task to a person; writing a document (such as a help document); modifying an existing document; identifying a document; altering availability of a document (such as to make the document more widely available such as posting the document on a web site); altering an organization of a web site; modifying a design of a product; modifying a packaging of a product; modifying a manufacturing process for a product; creating a software program; modifying a software program; creating a patch for a software program; contacting a customer, vendor, supplier, employee, or partner; modifying a marketing campaign; changing response time of service providers; training service personnel; discontinuing efforts that are no longer required; changing the process of writing and delivery of software programs; taking actions with reference to seasonal fluctuations; providing reports to customers regarding how issues are being monitored and addressed; recalling a product; making available a repair for a product; making available a modification for a product; changing recommended usage of a product; and other actions.

Taking an action with respect to a given category can be based on single-factor or multi-factor input variable analysis to determine a most effective issue resolution path. A single-factor input variable analysis refers to an analysis that takes into account a single input variable (e.g., defective hard disk drives). A multi-factor input variable analysis refers to an analysis that takes into account multiple input variables (e.g., defective hard disk drives and an inability to boot). In some cases, several factors (or categories) can be related. In the above example, customers with defective hard disk drives are usually unable to boot. Consequently, by performing multi-factor input variable analysis, it can be determined that solving the hard disk drive problem will also solve the inability to boot problem. In this manner, the expected ROI would be higher since multiple categories can be addressed by one action.

Aside from taking an action, some other event can be identified with respect to an issue. The event can result from action of a third party, such as the release of a new operating system by a third party vendor, release of patches from a third party software vendor, release of a new hardware platform, new governmental regulations, and so forth.

When an action or other event has occurred, a user can provide (at 399) an indication to the analysis tool 16 of the occurrence of the event, which is received by the analysis tool 16. The indication that the event has occurred can provide information regarding the type of event as well as a time that the event occurred. From this indication, the analysis tool 16 can determine a first time window prior to occurrence of the event, and a second time window after occurrence of the event. Identification of the two different time windows allows the impact measurement module 104 to generate quantification measures for cases in the two different time windows for the purpose of comparison to enable the determination of the impact of the event. As noted above, each case is associated with various information fields. One of the information fields includes a field to reflect a time that the case occurred (such as the time that a call was received by a call agent).

As shown in FIG. 5H, the impact measurement module 104 determines (at 420) an impact of an event. The impact of an event with respect to an issue is determined by categorizing (at 422) new cases after the event has occurred or after some period of time following the occurrence of the event after which the effects of the event are anticipated to be visible. Thus, a first time window is defined prior to the event, and a second time window is defined after the event. As an example, in the customer support context, the new cases include new calls received by a customer support organization with respect to a product or service. A quantification measure is then generated (at 424) for these new cases (occurring in the second time window). The quantification measure for the first time window is read (at 426). The quantification measure for the first time window can be either a baseline quantification measure or an adjusted (extrapolated or normalized) quantification measure.

The quantification measure for the second time window is then compared (at 428) to either the baseline quantification measure or adjusted quantification measure for the first time window.

When computing the quantification measure for the first and second time windows, the quantification measure can optionally be based on a probability distribution of cases associated with a category in each time window. The probability distribution includes weights that represent the likelihood that a particular case belongs to a category. The likelihood indicator (weight) is produced by the categorizer based on confidence levels computed by the categorizer when categorizing cases to a category. When computing the quantification measure for a category, both contribution to the aggregate number of cases associated with the category and the data fields used in the computation associated with a given case are adjusted based on the probability that the case is associated with the category.

Next, a measure of the impact is computed (at 430). The measure of the impact can be based on the actual savings, such as the reduced number of calls after action on an issue has occurred, the reduced amount of time involved in resolving calls resulting from the issue; a reduction in the amount of money spent by the organization to resolve calls resulting from the issue; the reduced amount of time, money, or aggravation experienced by the customer due to the action; the reduction in the amount of lost future revenue due to the action; the reduction in the estimated number of customers who gave up due to the issue; or any other impact measure. In some embodiments, the impact may be an increase in a desirable measure, such as revenue, profit, customer satisfaction, repeat business, or likelihood of purchase.

The measure of impact can just be a number reflecting the reduction in the amount of the above factors. Alternatively, the reduction in the above factors can be converted into a monetary value to indicate the measure of impact.

To calculate a return on investment (ROI), the impact measurement module 104 also receives (at 432) cost information relating to the action taken with respect to an issue. Cost information includes any or some combination of the following: labor cost to implement a product fix; material cost to implement the product fix; labor cost related to time spent creating documentation; and so forth. The impact measurement module 104 then computes (at 434) the ROI, which is based on the difference, ratio, or other relation between the monetary value (computed based on a reduction of the above listed factors) and the cost of the action to address the issue. Alternatively, direct savings (equal to the computed monetary value due to the reduction of the above-listed factors) can be used as a proxy for the return on investment. Direct savings can be expressed, for example, as "we saved $x" or "we expected this fix to save $x."

The impact measurement module 104 then provides (at 436) a report (such as one of the reports 138 in FIG. 2) regarding the impact of the action taken with respect to an issue. If multiple actions are taken with respect to respective multiple issues, then the report can be provided for the multiple issues for which actions have been taken. The report can be in graphical format, textual format, or in any other format.

Note that for a particular issue, multiple actions can be taken. For example, a company may release five different software patches for an issue. In such a scenario, it is desired that the impact of each of the actions taken with respect to the issue being measured, using techniques according to the above embodiments. Thus, in the example where five different patches are provided for a particular issue, quantification measures are calculated for respective time windows corresponding to time periods between successive patches. The quantification measures can then be compared with the baseline (or adjusted) quantification measure prior to the first patch, or alternatively, a comparison can be made among quantification measures for the different time periods, so as to determine the impact of a second patch versus the impact for the first patch, for example.

Steps 420-436 can thus be repeated (at 438) for additional actions taken with respect to a particular issue, or for actions taken with respect to other issues.

Instructions of the various software modules described above are loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). The storage media include either removable media or fixed media.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
producing, based on output from a categorizer executed on one or more processors, a first measure regarding cases associated with an issue;
receiving information regarding additional cases associated with the issue after one or more events have occurred with respect to the issue;
after the one or more events have occurred, producing, based on further output from the categorizer executed on the one or more processors, a second measure regarding the additional cases associated with the issue; and
training the categorizer, wherein training the categorizer comprises:
receiving a query relating to the issue;
identifying cases in response to the query;
receiving user confirmation or disconfirmation that the identified cases belong to the issue; and
developing training cases for training the categorizer based on receiving the user confirmation or disconfirmation.

2. The method of claim 1, further comprising comparing the first measure with the second measure to determine an impact of the one or more events with respect to the issue.

3. The method of claim 2, further comprising providing an indication of the comparing of the first and second measures.

4. The method of claim 3, wherein providing the indication comprises generating a report containing information relating to the comparing of the first and second measures.

5. The method of claim 1, wherein producing the first and second measures regarding the cases associated with the issue comprises producing the first and second measures regarding the cases associated with a problem, and
wherein receiving the information after the one or more events have occurred comprises receiving the information after a fix has been made available for the problem.

6. The method of claim 1, wherein producing the first and second measures regarding cases associated with the issue comprises producing the first and second measures regarding cases associated with an issue faced by a first organization, and
wherein receiving information after the one or more events have occurred comprises receiving the information after an event associated with a second organization has occurred.

7. The method of claim 1, wherein producing the first and second measures is performed by a quantifier associated with the categorizer.

8. The method of claim 1, wherein producing the first measure comprises:
computing an actual measure; and
adjusting, based on at least one factor, the actual measure to produce the first measure.

9. The method of claim 8, wherein adjusting the actual measure comprises extrapolating the measure for a future time period.

10. The method of claim 8, wherein adjusting the actual measure comprises normalizing the actual measure based on the at least one factor including at least one of seasonality, sales volume, product end-of-life, marketing, installed base under support contract, and installed base under warranty.

11. The method of claim 8, wherein producing the second measure comprises:
computing a second actual measure; and
adjusting, based on at least one factor, the second actual measure to produce the second measure.

12. The method of claim 11, further comprising comparing the first and second measures to determine an impact of the one or more events with respect to the issue.

13. The method of claim 1, wherein the one or more events comprise one or more fixes for the issue, the method further comprising:
comparing the first and second measures;
receiving cost information relating to the one or more fixes; and
reporting a return on investment based on comparing the first and second measures and the cost information.

14. The method of claim 1, further comprising identifying the one or more events for the issue, the one or more events comprising at least one of changing a product design; creating a software patch; creating a software program; creating printed documentation; altering documentation; creating on-line documentation; identifying existing documentation; altering availability of a document; creating automated diagnostic software; providing documentation to customer support representatives; identifying an action by a third party; allocating a sum of money for the issue; allocating a physical resource for the issue; hiring a person; assigning a task to a person; altering an organization of a web site; modifying a packaging of a product; modifying a manufacturing process for a product; contacting a customer, vendor, supplier, employee, or partner; modifying a marketing campaign; changing response time of service providers; training service personnel; discontinuing efforts that are no longer required; changing the process of writing and delivery of software programs; taking actions with reference to seasonal fluctuations; providing reports to customers regarding how the issue is being monitored and addressed; recalling a product; making available a repair for a product; making available a modification for a product; changing recommended usage of a product; release of a new operating system by a third party vendor; release of a patch from a third party software vendor; release of a new hardware platform by a third party vendor; and new governmental regulation.

15. The method of claim 1, wherein producing the first measure comprises producing at least one of a measure of a duration of calls; cost of repair; amount of time to resolve the calls; amount of lost revenue; an amount of money to resolve calls; amount of lost revenue due to calls; a degree of customer aggravation; an amount of time spent by customers before initiating a call; an amount of time spent by customers during the call; an amount of time spent diagnosing cases; an amount of money spent by customers;
an amount of money spent interacting with customers; an amount of money spent resolving the cases; a number of customers who declined to pay for a call; an amount estimating expected lost future revenue from the issue.

16. The method of claim 1, wherein the issue comprises a first problem, the method further comprising:
receiving a list of problems; and
selecting the first problem from among the list of problems.

17. The method of claim 16, further comprising receiving information prioritizing the problems in the list.

18. The method of claim 16, wherein selecting the first problem from among the list of problems is based on a prediction of a magnitude of further deterioration if the first problem is not addressed as compared to amount of savings expected from addressing the first problem.

19. The method of claim 1, further comprising generating a probability distribution of cases associated with the issue, the probability distribution containing weights associated with respective cases,
wherein producing the first measure is based on the weights.

20. A system, comprising:
one or more processors;
a categorizer executable on the one or more processors for categorizing cases in a data set into at least a first category, wherein the categorizer is a trained categorizer trained using a technique comprising:
receiving a query relating to the first category;
identifying cases in response to the query;
receiving user confirmation or disconfirmation that the identified cases belong to the first category; and
developing training cases for training the categorizer based on receiving the user confirmation or disconfirmation;
a quantifier executable on the one or more processors in cooperation with the trained categorizer to compute a first quantification measure for a first group of cases, and a second quantification measure for a second group of cases, wherein the first group of cases relates to cases prior to occurrence of an event corresponding to an issue associated with the first category, and the second group of cases relates to cases after occurrence of the event; and a module executable on the one or more processors to determine an impact of the event on the issue based on comparing the first and second quantification measures.

21. The system of claim 20, wherein the quantifier is executable on the one or more processors to produce the first quantification measure by adjusting a first actual measure based on at least one factor, wherein adjusting the first actual measure comprises one of extrapolating and normalizing the first actual measure.

22. A computer-readable storage medium storing instructions that when executed cause a system having a processor to:

produce, based on output from a categorizer, a first measure regarding cases associated with an issue;

receive information regarding additional cases associated with the issue after one or more events have occurred with respect to the issue;

produce, after the one or more events have occurred and based on further output from the categorizer, a second measure regarding the additional cases associated with the issue; and train the categorizer, wherein training the categorizer comprises:
receiving a query relating to the issue;
identifying cases in response to the query;
receiving user confirmation or disconfirmation that the identified cases belong to the issue; and
developing training cases for training the categorizer based on receiving the user confirmation or disconfirmation.

23. The computer-readable storage medium of claim 22, which when executed cause the system to further compare the first measure with the second measure to determine an impact of the one or more events with respect to the issue.

24. The computer-readable storage medium of claim 22, wherein producing the first and second measures regarding the cases associated with the issue comprises producing the first and second measures regarding the cases associated with a problem, and wherein receiving the information after the one or more events have occurred comprises receiving the information after a fix has been made available for the problem.

25. The computer-readable storage medium of claim 22, wherein producing the first and second measures is performed by a quantifier associated with the trained categorizer.

26. The computer-readable storage medium of claim 22, wherein producing the first measure comprises:
computing an actual measure; and
adjusting, based on at least one factor, the actual measure to produce the first measure.

27. The computer-readable storage medium of claim 26, wherein adjusting the actual measure comprises extrapolating the measure for a future time period.

28. The computer-readable storage medium of claim 22, wherein the one or more events comprise one or more fixes for the issue, the instructions which when executed cause the system to further:
compare the first and second measures;
receive cost information relating to the one or more fixes; and
report a return on investment based on comparing the first and second measures and the cost information.

29. A method comprising:
computing, based on output from a categorizer executed on one or more processors, a first measure regarding a first set of cases associated with a first issue and a second measure regarding a second set of cases associated with the first issue, wherein the first set of cases is associated with a first time period prior to occurrence of an event, and wherein the second set of cases is associated with a second time period after occurrence of the event;
comparing, by the one or more processors, the first and second measures to determine an impact of the event on the first issue;
identifying plural issues including the first issue;
selecting the first issue from among the plural issues based on an expected return on investment; and
effecting action with respect the first issue, wherein the event comprises the action.

30. The method of claim 29, wherein determining the impact of the event on the issue comprises determining the impact of an action with respect to a customer support issue.

31. A system, comprising:
one or more processors;
a categorizer executable on the one or more processors;
a search engine to identify at least one case in response to a query relating to an issue;
an interface to receive an indication that the identified at least one case belongs to the issue; and
a training module executable on the one or more processors to train the categorizer based on the received indication;
the trained categorizer executable on the one or more processors to classify cases in a data set into the issue;
a quantifier executable on the one or more processors in cooperation with the trained categorizer to compute a first quantification measure for a first time window, and a second quantification measure for a second time window, wherein the first time window is prior to occurrence of an event corresponding to the issue, and the second time window is after occurrence of the event; and
a module executable on the one or more processors to determine an impact of the event on the issue based on comparing the first and second quantification measures.

32. The method of claim 1, wherein producing the first measure and producing the second measure are performed based on output of the trained categorizer.

33. The method of claim 32, wherein developing the training cases comprises:
adding at least one of the identified cases to a positive training set in response to receiving user confirmation; and
adding at least one of the identified cases to a negative training set in response to receiving user disconfirmation,
wherein the developed training cases include the positive training set and the negative training set.

34. The system of claim 20, wherein developing the training cases comprises:
adding at least one of the identified cases to a positive training set in response to receiving user confirmation; and
adding at least one of the identified cases to a negative training set in response to receiving user disconfirmation,
wherein the developed training cases include the positive training set and the negative training set.

35. The computer-readable storage medium of claim 22, wherein developing the training cases comprises:

adding at least one of the identified cases to a positive training set in response to receiving user confirmation; and adding at least one of the identified cases to a negative training set in response to receiving user disconfirmation, wherein the developed training cases include the positive training set and the negative training set.

36. The system of claim 31, wherein the training module is to train the categorizer using a positive training set of cases and a negative training set of cases, wherein the training module is to add the identified one case to the positive training set in response to receiving the indication that the identified at least one case belongs to the issue, and wherein the training module is to add the identified one case to the negative training set in response to receiving the indication that the identified at least on e case does not belong to the issue.

* * * * *

UNITED STATES PATENT AND TRADEMARK OFFICE
CERTIFICATE OF CORRECTION

PATENT NO. : 8,719,073 B1  
APPLICATION NO. : 11/211979  
DATED : May 6, 2014  
INVENTOR(S) : Evan R. Kirshenbaum et al.

Page 1 of 1

It is certified that error appears in the above-identified patent and that said Letters Patent is hereby corrected as shown below:

In the Claims

In column 26, line 17, in Claim 29, after "respect" insert -- to --.

In column 27, line 17, in Claim 36, delete "on e" and insert -- one --, therefor.

Signed and Sealed this
Fifth Day of August, 2014

Michelle K. Lee
*Deputy Director of the United States Patent and Trademark Office*